Nov. 22, 1960 E. R. DOAK 2,961,189
VERTICAL TAKE-OFF AIRCRAFT CONSTRUCTION
Original Filed Dec. 1, 1954 4 Sheets-Sheet 1

INVENTOR.
EDMOND R. DOAK
BY
ATTORNEY.

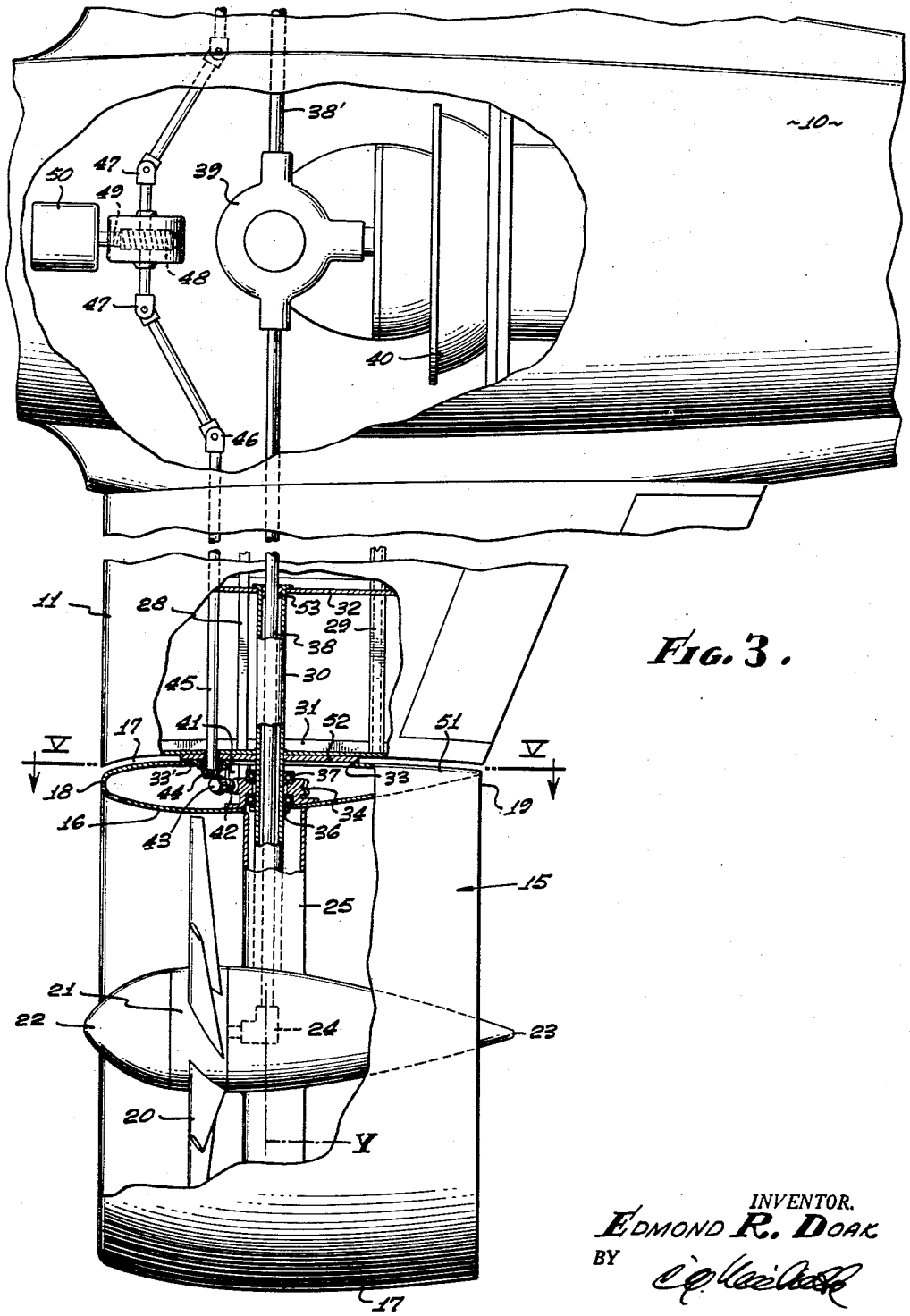

Nov. 22, 1960 E. R. DOAK 2,961,189
VERTICAL TAKE-OFF AIRCRAFT CONSTRUCTION
Original Filed Dec. 1, 1954 4 Sheets-Sheet 3

INVENTOR.
EDMOND R. DOAK
BY
ATTORNEY.

Nov. 22, 1960  E. R. DOAK  2,961,189
VERTICAL TAKE-OFF AIRCRAFT CONSTRUCTION
Original Filed Dec. 1, 1954  4 Sheets-Sheet 4
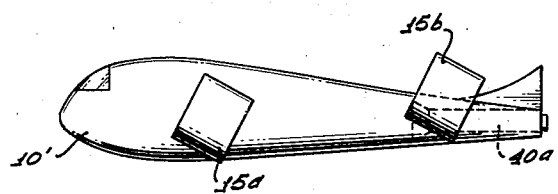
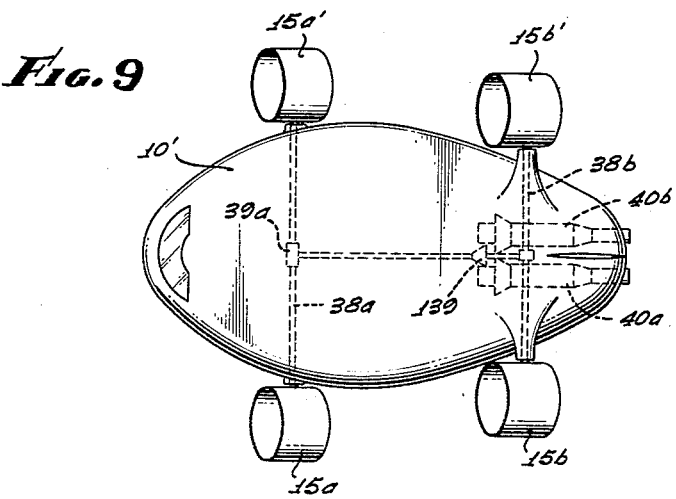
INVENTOR.
EDMOND R. DOAK
BY
ATTORNEY.

United States Patent Office 2,961,189
Patented Nov. 22, 1960

2,961,189
VERTICAL TAKE-OFF AIRCRAFT CONSTRUCTION

Edmond R. Doak, 1066 Stearns Drive, Los Angeles 35, Calif.

Continuation of application Ser. No. 472,313, Dec. 1, 1954. This application Dec. 12, 1958, Ser. No. 780,164

7 Claims. (Cl. 244—12)

This invention relates to an aircraft provided with controllable means for facilitating take-off and landing on short runways and capable of substantial hovering.

Military and civilian activities have indicated a requirement for an aircraft capable of becoming airborne from short landing fields, capable of controlled rapid flight without the necessity of carrying an excessive load of fuel, capable of substantially hovering over a given objective, and capable of landing by virtually vertical descent if occasion so requires. Said planes can be used for rescue work, reconnaissance, delivery of supplies to isolated posts, and many other purposes for which former types of aircraft have not been suited. Modern, high-speed airplanes (whether propeller driven or provided with jets) are capable of high speeds but are incapable of hovering or being airborne or landing in restricted areas or small landing fields. Helicopters, on the other hand, are incapable of forward flight at high speed and therefore are incapable of reaching a desired distant objective with sufficient rapidity to insure delivery of material or successful rescue. Moreover, mechanical limitations of helicopters, gyroplanes and autogyros restrict their use.

The present application is a continuation of application Serial No. 472,313, filed December 1, 1954, now abandoned, and a continuation-in-part of application Serial No. 171,705, filed July 1, 1950 now Patent No. 2,730,311 directed to aerodynamic units employing a thrust-generating means positioned within a throat, duct or passageway having smooth, virtually imperforate walls, each such thrust-generating unit preferably comprising a bladed, suitably designed propeller positioned within such passageway, throat or duct. As disclosed in the prior application, a plurality of such thrust-generating units may be carried by the aircraft, such units being suitably arranged with respect to the axis of symmetry so as to produce a controllable aircraft capable of ascending and descending in a substantially vertical manner and of high-speed level flight.

The present invention constitutes a further development of the original disclosures and is particularly directed to an aircraft wherein the propulsion units are laterally and symmetrically displaced with respect to the body. The present invention also contemplates an aircraft wherein each propulsion unit comprises an open-ended tubular duct having a wall of airfoil configuration in section and a mutibladed fan or impeller in such duct mounted for rotation about an axis coincidental with the axis of such duct. Such thrust-producing propulsion units may be carried by the lateral extremities of the wings and be provided with means for partially rotating each such propulsion unit about an axis transverse to the body of the aircraft (the pitch, lateral or Y axis), whereby the direction and angle of the thrust generated by each propulsion unit may be controllably varied through a range of 90° or more, thereby permitting the aircraft to become airborne and to land on short runways or in a virtually vertical manner and fly at high speed after being airborne.

It is an object of the present invention, therefore, to disclose and provide means and methods whereby thrust-generating units may be employed in an aircraft of the character described hereinabove.

Another object of the invention is to disclose and provide a novel type of aircraft including thrust-generating propulsion units carried in laterally spaced relation to the body of the aircraft and preferably by the lateral extremity of the wing, the thrust-generating units being energized by a power plant positioned within the body, force moments due to masses laterally displaced with respect to the axis of symmetry being minimized.

A further object of the invention is to disclose and provide means and constructions for controllably varying the direction of thrust generated by the propulsion units carried by an aircraft.

An object of the present invention is to disclose and provide aircraft provided with propulsion units and means for controllably varying the attitude of such propulsion units.

Moreover, it is an object of the present invention to disclose and provide an aircraft wherein the thrust propulsion units are mounted so that in any position the thrust stream from such units do not impinge on any portion of the aircraft.

These and various other objects of the invention and advantages resulting therefrom will become apparent to those skilled in the art from the following description. For purposes of illustration, reference will be had to the appended drawings, in which:

Fig. 3 is an enlarged plan view of a portion of the airplane shown in Figs. 1 and 2, portions of the wing surface and of a thrust-producing propulsion unit being broken away.

Fig. 8 is a side elevation of another form of aircraft provided with thrust producing units; and Fig. 9 is a plan view of Fig. 8, driving means being diagrammatically indicated.

Figure 1:
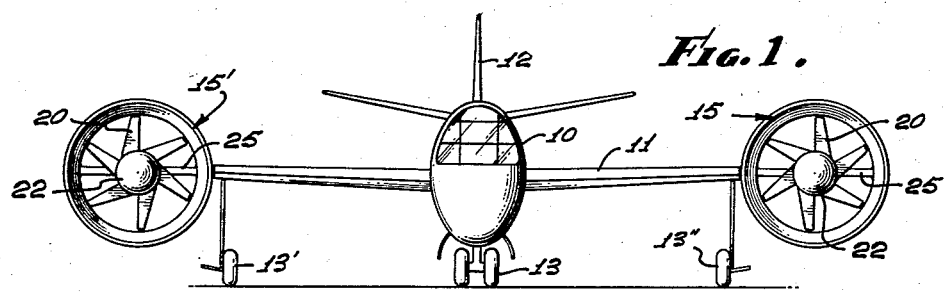
Fig. 1 is a front view of an airplane illustrating one method and construction wherein thrust-producing propulsion units are carried by lateral extremities of the wings.
Figure 2:
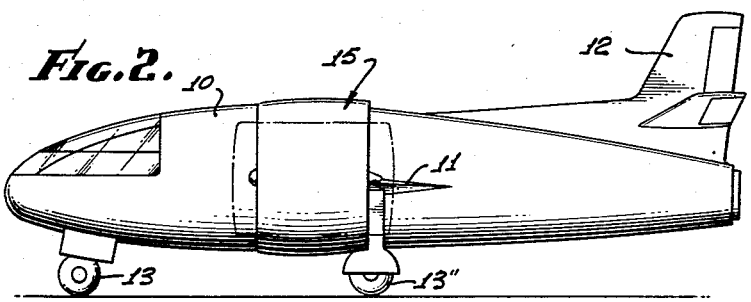
Fig. 2 is a side elevation of the airplane shown in Fig. 1, illustrating two positions of the thrust-generating units.

The present invention is an improvement upon the subject matter of my prior application but continues to employ thrust-producing propulsion units, preferably bladed and rotating within a duct or throat. Figs. 1 and 2 illustrate one form of airplane utilizing the present concepts. The airplane there shown comprises a fuselage 10 provided with a wing 11, and although a relatively conventional tail section or empennage is illustrated at 12 with horizontal and vertical stabilizers, elevator, rudder and trim tabs, it is possible to employ vertical stabilizers and rudders at the trailing edges of the wing 11, displaced with respect to the vertical plane of symmetry and elevons or combined ailerons and elevators to provide longitudinal and lateral control. A formalized alighting gear is indicated at 13 with retractable, wing-tip, auxiliary alighting gear at 13' and 13". It is to be understood that the present invention is not directed to details of construction such as alighting gear, stabilizers, rudders, elevators and the like, and therefore these details are not described but are indicated in the drawings as exemplary of various constructions and designs which may be employed.

Attention is called to the fact that Figs. 1 and 2 show a thrust-producing propulsion unit 15 and 15' carried by each lateral extremity of the wing 11, such propulsion unit including a thrust-generating means positioned within an open-ended duct, such duct preferably having walls of airfoil section. These thrust-producing propulsion units are suitably mounted so that their attitude may be controllably changed and the thrust generated by each of the units is in a plane spaced outwardly from the extremities of the wings as evident from the drawings. In Figs. 1 and 2, the propulsion units 15 are shown in full lines with their axes parallel to the longitudinal or roll-and-bank axis of the aircraft; in Fig. 2, the propulsion unit is also shown in dash lines wherein its axis is substantially vertical and at right angles to the longitudinal axis, a position assumed when it is desired to have the aircraft hover or rise vertically.

Figure 4:
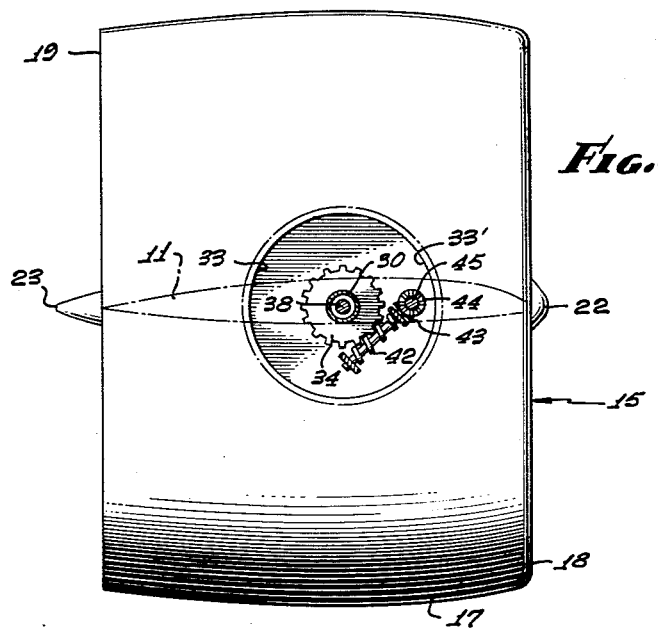
Fig. 4 is a vertical section taken along plane V—V in Fig. 3.

As best seen from Figs. 3 and 4, the propulsion unit 15 comprises walls of airfoil cross section presenting a smooth, internal, tubular surface 16 and an external surface 17, these two surfaces merging to form a leading edge 18 and a trailing edge 19. The internal surface 16 may, in effect, give rise to a duct having a slightly smaller internal diameter in a zone from about 30% to 60% of the total length of such duct from the leading edge 18. The total length of such duct (equivalent to the chord or distance from leading edge to trailing edge) may be substantially equivalent to the chord of the wing 11 adjacent the propulsion unit. By reason of some of the desirable characteristics of the propulsion units including their ability to restrict spillage of air over the wing tips, the aspect ratio of the wing 11 can be reduced.

Centrally positioned within the open-ended duct of the propulsion unit 15 is a multibladed fan 20 carried by a hub portion 21 mounted for rotation upon an axis coincidental with the axis of the duct. The hub portion 21 may have an outer surface merging with a nose portion 22 and a trailing or rear portion 23 which encloses a suitable gear unit 24 and the shaft driving the multibladed fan. A spider or a series of spaced contravanes 25 attached to the trailing housing portion 23 and to the walls of the duct maintain the blade assembly, gear box and shaft in proper position within the duct. It is to be understood that the blades 20 may be of any desired configuration, spacing or type, but preferably the tips of such blades move in proximity to the internal surface 16 of the tubular duct. Moreover, instead of employing but a single set of blades 20, the propulsion unit may carry two sets, with means to impart counter-rotation to the second set of blades. In such cases contravanes may be eliminated, although a spider may still be employed to maintain the rotating assembly in proper position within the duct.

Means are provided for imparting rotation to the multibladed fans within each of the propulsion units and for imparting controllable partial rotation to such units for the purpose of varying the attitude thereof with respect to the longitudinal axis of the airplane. Various means may be employed for imparting simultaneous partial rotation to the propulsion units and Figs. 3 and 4 are illustrative of one arrangement of elements which may be employed for accomplishing such rotation. As evident from the drawings, the means for rotatably mounting the propulsion units allows the units to generate thrust in a plane spaced outwardly from the extremities of the wings and extending substantially parallel to the longitudinal axis of the aircraft in all positions of partial rotation of the units and the means for controlling the rotation of the units is adapted to partially rotate the units between vertical and horizontal positions without impingement of the thrust stream upon the aircraft. Therefore, the thrust from the units 15 and 15' does not interfere with the normal steering or control surfaces, such as the ailerons, rudder and elevators. As indicated in Fig. 3, a stationary tubular trunnion shaft 30 is firmly mounted with respect to the wing 11 and extends outwardly therefrom beyond the tip thereof and into the stationary portion 23 of the fan hub unit. For purposes of illustration only, the wing 11 is shown provided with a front spar or wing beam 28, a rear spar 29 and ribs such as 31 and 32. These spars and ribs are simply illustrative of methods employed in wing construction. The hollow trunnion shaft 30 may be attached to a face of the front spar 28 in any suitable manner and to the ribs 31 and 32. The external surface of the propulsion unit 15 may be provided with a circular aperture (defined by the edges 33 and 33') surrounding the hollow trunnion shaft 30 but spaced therefrom. Within the wall of the shroud of the propulsion unit 15 there is firmly mounted a worm wheel 34, the trunnion shaft 30 extending therethrough. Suitable radial and thrust bearings 35 are carried between the trunnion shaft 30 and the hub of the worm wheel 34, a stop ring 36 being carried by the trunnion shaft so as to prevent axial displacement of the propulsion unit with respect to the trunnion shaft. Additional bearings such as 37 may be employed for the purpose of resisting other axial or normal thrust forces.

Extending through the hollow trunnion shaft 30 is the fan drive shaft 38, such fan drive shaft being operatively connected to the gears in gear box 24 for transmitting rotation to the shaft and hub upon which blades 20 are mounted. The fan drive shaft 38 extends to the body or fuselage 10 of the airplane and obtains its power through gear box 39 and main power plant 40 located within the fuselage. Gear box 39 is also provided with fan drive shaft 38' which extends in the opposite direction to the propulsion unit 15' located at the other extremity of the wing. A single power plant (any type of engine or geared combination of engines may be used) therefore provides driving forces for both of the multibladed fans located in the tubular ducts of the propulsion units.

Means are provided for controllably and partially rotating the propulsion units about the lateral or Y axis of the aircraft. Extending outwardly from the terminal rib 31 is a suitable bracket 41 in which a worm 42 is journaled, this worm being in engagement with the worm wheel 34. The end of the worm shaft also carries a bevel gear 43 in engagement with the bevel gear 44 carried by the end of a rotational drive shaft 45 suitably journaled in bearings carried by ribs of the wing, such rotational drive shaft extending into the body 10 of the airplane. Universal joints such as 46 and 47 may be employed in order to impart proper flexibility to the drive shaft. The drive shaft 45 carries a worm gear 48 in engagement with a worm 49 driven by a drive motor 50. It will be evident that whenever the motor 50 is driven it will cause rotation of drive shaft 45, rotation of such drive shaft being transmitted by bevel gears 43 and 44 to worm 42 and worm wheel 34. Since the latter is firmly connected to the shroud of the propulsion unit 15, the entire propulsion unit will be rotated upon the trunnion shaft 30. It may be noted at this time that the contour of the wing tip 11 is preferably of a configuration 51 approximating the curvatures of the outer surface 17 of the shroud so that when the propulsion units 15 are forwardly directed very little space exists between the wing tip and the propulsion unit carried thereby. The circular opening (having the margins 33, 33') formed in the external surface of the propulsion unit is normally closed by means of a circular plate 52 carried by the wing tip, sliding contact being made between such closure plate and the movable propulsion unit. It is to be understood that suitable bearings such as 53 are used between the trunnion shaft 30 and the fan drive shaft 38 as well as at spaced points along such drive shaft. In some instances the hollow tubular trunnion shaft 30 may constitute an element of the main wing spar.

Figure 6:
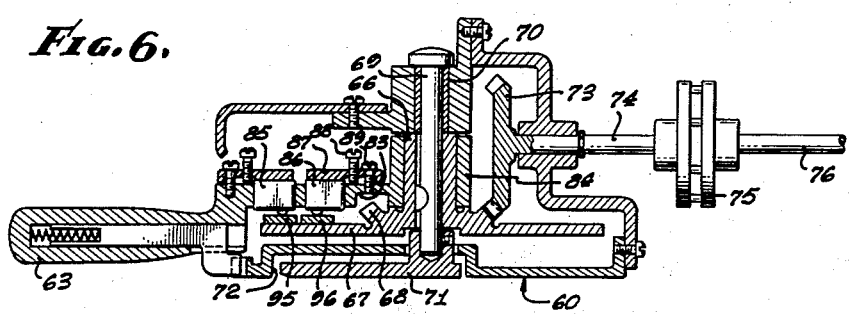
Fig. 6 is a transverse section taken along the plane VII—VII in Fig. 5.
Figure 5:
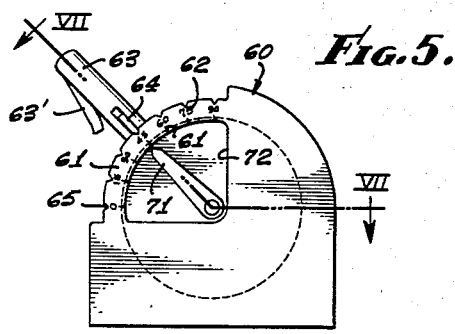
Fig. 5 is a side elevation of an attitude control unit employed in selectively positioning the propulsion units.

Various means may be employed for controlling the attitude of the propulsion units, and Figs. 5 and 6 are illustrative of one arrangement of elements which may be employed in obtaining such control and visually indicating the attitude of the propulsion units to the pilot. In the illustrated form of apparatus, a suitable housing and support frame 60 may be provided with a quadrant edge 61 carrying indicia 62 in degrees for the purpose of indicating the attitude of the propulsion units. Extending from the housing 60 is a selector control handle 63 provided with a movable indexing element 64 capable of engaging any desired notch 65 formed in the edge of the quadrant 61 of the stationary housing. The indexing element may be withdrawn from a notch whenever the selector control handle 63 is gripped and lever 63' is depressed, spring means being employed to firmly hold the indexing element 64 in a notch when the device has been set.

The handle 63 extends into the housing 60 and is journaled for free movement upon the hub 66 of a circular plate 67 provided with a bevel gear 68. The hub 66 is keyed to a stud shaft 69 journaled in a bearing 70 carried by the housing 60. The end of the stud shaft 69 is provided with a pointer 71 which is capable of moving in a recess 72 formed in the external surface of the housing 60 adjacent the quadrant 61. The circular disc 67 and bevel gear 68 carried thereby are driven by bevel gear 73 mounted upon the end of shaft 74 also suitably journaled in the housing 60, the shaft 74 being connected as by means of a flexible coupling 75 to an indicator shaft 76 provided with a worm wheel 77 in engagement with a worm 78 carried by a portion of the rotational drive shaft 45. The ratio between worm wheel and worm 77 and 78 is identical to the ratio between the worm wheel and worm 48 and 49; bevel gears 68 and 73 are of 1:1 ratio so that attitude of the propulsion units is visually and accurately indicated by the pointer 71 and its relationship to the quadrant 61 and indicia carried thereby.

Figure 7:
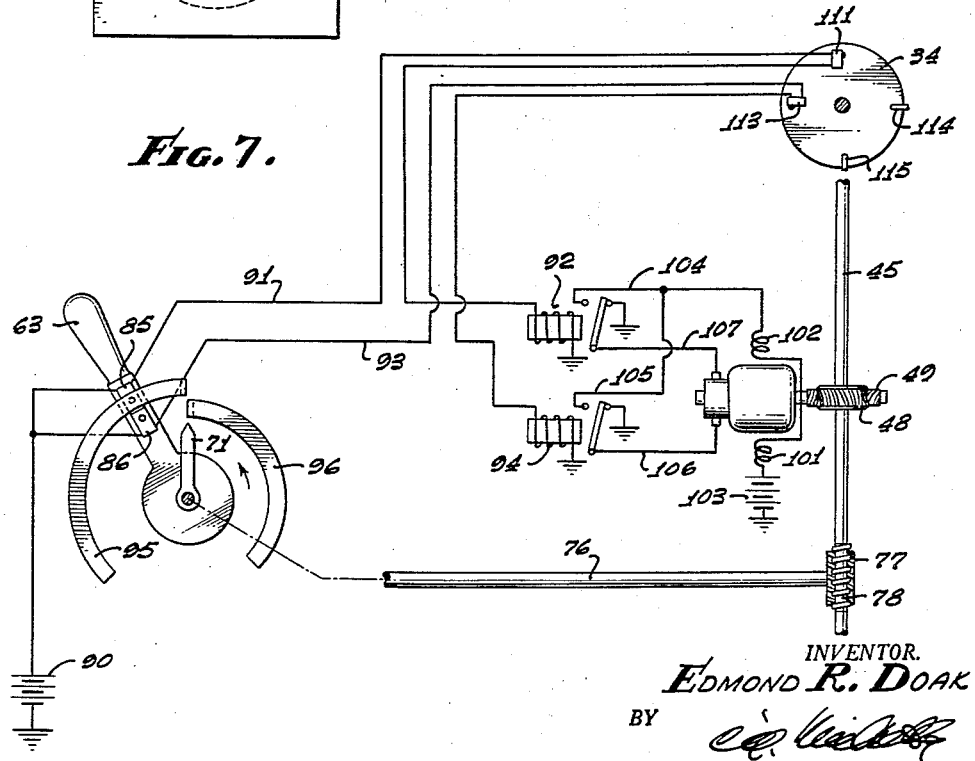
Fig. 7 is a wiring diagram and schematic representation of means employed in controllably positioning the propulsion units.

The selector control handle 63 extends from an offset web 83 provided with the collar 84 which is journaled upon the hub 66. The web portion 83 is provided with a pair of apertures adapted to receive and hold, at varying distances from the center of the collar 84 a pair of microswitches 85 and 86. These microswitches may be adjustably positionable, as for example, by means of presser plates such as 87 provided with adjustment screws 88 and 89. The microswitches 85 and 86 are adapted to move with the handle 63 along arcuate paths so as to contact cam strips 95 and 96, respectively, attached to the disc 67. In the form shown, the microswitches 85 and 86 are of the "press to break" type; the cam strips 95 and 96 are in the form of quadrants, as best shown in Fig. 7. The adjacent ends of the quadrants 95 and 96 are slightly tapered so that when the handle 63 is in such position with respect to the cam strips 95 and 96 that the contact buttons of the microswitches are in substantial alignment with the edges of the cam strips 95 and 96 and with indicator pointer 71, both of the microswitches 85 and 86 are in circuit open position.

By referring to Fig. 7 it will be noted that the microswitches 85 and 86 are connected to a battery 90, microswitch 85 being connected as by line 91 to a relay switch 92, whereas microswitch 86 is connected by line 93 to relay switch 94. These switches 92 and 94 are normally kept in open position as indicated in Fig. 7. Field coils 101 and 102 of drive motor 50 are connected to a source of current such as battery 103 and then by lines 104 and 105 to the relay switches 92 and 94 respectively. When the handle 63 of the attitude selector control is moved to a new position, as shown in full lines in Fig. 7, it will be evident that microswitch 85 is in contact with cam strip 95 so that such microswitch 85 is open. Microswitch 86, however, has been moved out of contact with cam strip 96 and therefore such microswitch 86 has closed its contact. Current is therefore permitted to flow from the battery 90 through microswitch 86 and line 93 to relay 94, causing relay switch 94 to move into circuit closed position (from the position shown in the diagram Fig. 7), thereby permitting current to flow from 103 through the field coils 101 and 102 and line 105 to the commutator of the motor by line 106 and then by line 107 through the open relay switch 92 to ground. Motor 50 is thus energized to drive rotational drive shaft 45 and thereby change the attitude of the propulsion units 15 and 15'. As soon as drive shaft 45 begins to rotate, it transmits rotation by worm 78 and worm wheel 77 to indicator shaft 76 which turns cam disc 67 in the direction of the arrow and simultaneously moves the indicator 71 in the same direction. Movement of the cam carrying disc 67 continues until the leading edge of cam strip 96 breaks the circuit by opening microswitch 86. In the event there is a certain amount of override, microswitch 85 will be opened by having lost its contact with cam strip 95 and as soon as microswitch 85 closes the circuit, relay 92 will become energized (relay 94 having been automatically opened as soon as microswitch 86 is opened) momentarily reversing the flow of current through the commutator leads and thereby reversing the motor drive so as to positively bring the propulsion units into desired attitude. Index finger or pointer 71 therefore permits the pilot or operator to visually observe the response initiated by movement of selector control handle 63.

In the description given hereinabove, limit switches 111 and 113 have been disregarded. These limit switches 111 and 113 are interposed in lines 91 and 93, respectively, leading to the relays 92 and 94. These microswitches 111 and 113 are of the normally closed type and are preferably mounted upon a stational portion of the wing tip in proximity to the worm wheel 34, such worm wheel being provided with stops 114 and 115, respectively, adapted to contact switches 111 and 113, respectively, when the entire propulsion unit reaches its maximum change in attitude. The limit switches 111 and 113 therefore prevent the propulsion units from inadvertently exceeding certain predetermined limits.

Figs. 8 and 9 illustrate an aircraft provided with a plurality of propulsion units, and for purposes of simplifying description the same numerals will be employed for corresponding elements as in the previous description. The body 10' of the aircraft may be of such contours as to obviate the necessity of having separate wings and be provided with a forward laterally spaced pair of propulsion units 15a and 15a' as well as an aft, laterally spaced pair of propulsion units indicated at 15b and 15b'. Both pairs of thrust-producing propulsion units may be driven from a pair of geared motors 40a and 40b, the two motors being geared together as at 139, one shaft leading to gear box 39a for the purpose of transmitting power to fan drive shaft 38a whereas another rearwardly extending drive shaft and its associated gearing transmits power to the rear fan drive shaft 38b. All four propulsion units of this aircraft can be partially rotated in a controllable manner either concurrently or in pairs, the rotational drive shaft for controllably changing the attitude of the propulsion units and other details not being illustrated in Figs. 8 and 9 in order to simplify description. Moreover, it is to be understood that thrust-producing units 15a and 15a' may be larger or capable of generating a greater thrust than the rear pair 15b and 15b'.

Those skilled in the art will appreciate the numerous changes, modifications and adaptations that can be made in utilizing the inventive concepts herein disclosed.

I claim:

1. In an aircraft, the provision of: a body, a power plant positioned in the body, at least one pair of propulsion units carried by the aircraft, said units being laterally displaced and symmetrically arranged with respect to the body, each propulsion unit comprising an open-ended, tubular duct having a wall of airfoil section, and a multibladed fan in such duct mounted for rotation about an axis coincidental with the axis of such duct, means for transmitting power from the power plant to each of said propulsion units; means for simultaneously and equally controllably rotating such propulsion units about an axis transverse to the body, said means comprising a driven drive shaft operably connected to said propulsion units and adapted to rotate the same about an axis transverse to the body to a desired attitude; reversible motor means for driving said drive shaft; a movable pointer indicating attitude of propulsion units, said pointer being driven by the drive shaft; an attitude selector handle manually movable with respect to said pointer, said handle including electrical switch means; switch-actuating means movable with said pointer and arranged to cooperate with said switch means; and an electrical circuit including said reversible motor, switch-actuating means and switch means for energizing said motor in a direction established by movement of said attitude selector handle.

2. In an aircraft including a body and laterally disposed wings, the provision of: a pair of propulsion units carried by the aircraft, said units being laterally displaced and symmetrically arranged with respect to the body, each propulsion unit comprising an open-ended, tubular duct having a wall of airfoil section and a multibladed fan in such duct mounted for rotation about an axis coincidental with the axis of such duct; means for simultaneously and equally, controllably, partially rotating such propulsion units about an axis transverse to the body through a range of about 90°; said means for simultaneously and equally partially rotating such propulsion units comprising a driven drive shaft operably connected to said propulsion units and adapted to rotate the same about an axis transverse to the body to a desired attitude; reversible motor means for driving said drive shaft; a movable pointer indicating attitude of propulsion units, said pointer being driven by the drive shaft; an attitude selector handle manually movable with respect to said pointer, said handle including electrical switch means; switch-actuating means movable with said pointer and arranged to cooperate with said switch means; and an electrical circuit including said reversible motor, switch-actuating means and switch means for energizing said motor in a direction established by movement of said attitude selector handle.

3. In an aircraft including an axial body and laterally extending wings, the provision of: a thrust-producing propulsion unit carried by each of the wings in laterally spaced relation to the body; means for controllably, partially rotating such propulsion units about an axis transverse to said body through a range of 90°; control means carried by the discharge end portion of each of said propulsion units and movable bodily with said units; said means for controllably partially rotating such propulsion units comprising a driven drive shaft operably connected to said propulsion units and adapted to rotate the same about an axis transverse to the body to a desired attitude; reversible motor means for driving said drive shaft; a movable pointer indicating attitude of propulsion units, said pointer being driven by the drive shaft; an attitude selector handle manually movable with respect to said pointer, said handle including electrical switch means; switch-actuating means movable with said pointer and arranged to cooperate with said switch means; and an electrical circuit including said reversible motor, switch-actuating means and switch means for energizing said motor in a direction established by movement of said attitude selector handle.

4. In an aircraft including a longitudinal body and transversely extending wings, the provision of: a shaft extending from the lateral extremity of each wing, a thrust-producing propulsion unit carried by each of said shafts, each propulsion unit comprising an open-ended tubular duct having a wall of airfoil section and a multibladed fan in such duct mounted for rotation about an axis coincidental with the axis of such duct; and means for simultaneously and equally, controllably, partially rotating such propulsion units through an angle of about 90° about an axis transverse to the longitudinal axis of the aircraft to allow the units to generate axial thrust in a plane spaced outwardly from the extremity of each wing and extending substantially parallel to the longitudinal axis of the aircraft in all positions of partial rotation without impingement of a thrust stream on said wings and body of the aircraft.

5. In an aircraft including a longitudinal body and transversely extending wings, the provision of: a shaft extending from the lateral extremity of each wing, a thrust-producing propulsion unit carried by each of said shafts, each propulsion unit comprising an open-ended tubular duct having a wall of airfoil section and a multibladed fan in such duct mounted for rotation about an axis coincidental with the axis of such duct; means for rotatably mounting one of said propulsion units on one of said shafts for movement through an angle of approximately 90° about an axis transverse to the longitudinal axis of the aircraft, each unit generating axial thrust in a plane spaced outwardly from the extremity of its respective wing and extending substantially parallel to the longitudinal axis of the aircraft, in all positions of partial rotation of the units; means for controllably, partially rotating said propulsion units to position them in inclined positions between vertical and horizontal without impingement of the thrust stream upon the aircraft; and control means carried by the aft portion of each of said propulsion units and extending into the thrust stream therefrom and movable bodily with said units.

6. In an aircraft including a longitudinal body and transversely extending wings, the provision of: a shaft extending from the lateral extremity of each wing, a thrust-producing propulsion unit carried by each of said shafts, each propulsion unit comprising an open-ended duct enclosing a thrust-generating means, each duct being pivotally mounted for rotation about an axis transverse to the longitudinal axis of the aircraft; and means for simultaneously and equally, controllably, partially rotating such propulsion units through an angle of about 90° about said transverse axis, said units being spaced to allow the units to generate axial thrust in a plane spaced outwardly from the extremity of each wing and extending substantially parallel to the longitudinal axis of the aircraft in all positions of partial rotation without impingement of a thrust stream on said wings and body of the aircraft.

7. In an aircraft including a longitudinal body, transversely extending wings, and the normal control surfaces, the provision of: a shaft extending from the lateral extremity of each wing, a thrust-producing propulsion unit carried by each of said shafts for propelling, raising and lowering the aircraft and for nonsteering cooperation with the normal control surfaces of the aircraft, each propulsion unit comprising an open-ended tubular duct having a wall of airfoil section and enclosing a thrust-generating means; means for rotatably mounting one of said propulsion units on one of said shafts for movement through an angle of approximately 90° about an axis transverse to the longitudinal axis of the aircraft, each unit generating axial thrust in a plane spaced outwardly from the extremity of its respective wing and extending substantially parallel to the longitudinal axis of the aircraft in all positions of partial rotation of the units; and means for controllably, partially rotating said propulsion units to position them in positions between vertical and horizontal without impingement of the thrust stream upon the aircraft and without steering cooperation with the normal control surfaces.

References Cited in the file of this patent

UNITED STATES PATENTS

| | | |
|---|---|---|
| 1,697,770 | Kreikenbohm | Jan. 1, 1929 |
| 1,734,251 | Gallet | Nov. 5, 1929 |
| 2,702,168 | Platt | Feb. 15, 1955 |

FOREIGN PATENTS

| | | |
|---|---|---|
| 893,866 | France | Feb. 28, 1944 |

OTHER REFERENCES

Aviation News, issue of February 18, 1946, page 14.
Popular Science, issue of April 1949, page 140.